US010275856B2

United States Patent
Gottlieb et al.

(10) Patent No.: US 10,275,856 B2
(45) Date of Patent: Apr. 30, 2019

(54) COMPOSITED ANIMATION

(71) Applicant: Facebook, Inc., Menlo Park, CA (US)

(72) Inventors: Alexis Hope Gottlieb, Somerville, MA (US); Daniel Joshua Steinbock, Berkeley, CA (US); Siyin Yang, Mercer Island, WA (US); Clark Scheff, Seattle, WA (US); Sridhar Rao, Palo Alto, CA (US); Alexander Charles Granieri, Palo Alto, CA (US); Francislav Penov, Kirkland, WA (US); Upendra Shardanand, Seattle, WA (US); Eric Erkon Hsin, Seattle, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/668,615

(22) Filed: Aug. 3, 2017

(65) Prior Publication Data

US 2019/0043166 A1    Feb. 7, 2019

(51) Int. Cl.
| | | |
|---|---|---|
| *G06T 13/20* | (2011.01) | |
| *G06T 13/80* | (2011.01) | |
| *G06T 3/00* | (2006.01) | |
| *G06T 3/40* | (2006.01) | |
| *G06T 7/285* | (2017.01) | |
| *G06T 7/292* | (2017.01) | |

(52) U.S. Cl.
CPC ......... *G06T 3/4038* (2013.01); *G06T 3/0006* (2013.01); *G06T 7/285* (2017.01); *G06T 7/292* (2017.01); *G06T 13/20* (2013.01); *G06T 13/80* (2013.01)

(58) Field of Classification Search
CPC ..... G06T 3/4038; G06T 3/0006; G06T 13/20; G06T 13/80; G06T 7/292; G06T 7/285
USPC .......................................... 345/473, 629, 676
See application file for complete search history.

(56) References Cited

U.S. PATENT DOCUMENTS

| | | | | |
|---|---|---|---|---|
| 5,566,251 A | | 10/1996 | Hanna | |
| 6,061,532 A | * | 5/2000 | Bell ...................... | A63F 13/00 |
| | | | | 345/629 |
| 9,047,692 B1 | * | 6/2015 | Seitz ...................... | G06T 3/4038 |

(Continued)

OTHER PUBLICATIONS

International Search Report and Written Opinion for International Application No. PCT/US2017/046040, dated Apr. 26, 2018.

*Primary Examiner* — Chante E Harrison
(74) *Attorney, Agent, or Firm* — Baker Botts L.L.P.

(57) ABSTRACT

In one embodiment, a method includes receiving at least two images captured by one or more cameras, wherein a first image of the at least two images has a subject and a second image of the at least two images comprises a perspective of the geographic location that is different than the first image; identifying an object that is common to the at least two images; computing a difference in perspective between the images that is based on a difference in size and shape between the object in the first image and the object in the second image; generating, based on the difference in perspective, an animation of a transition from the first image to the second image, wherein the animation comprises both the first image and the second image, and wherein the animation adds a modified version of the subject to the second image.

20 Claims, 7 Drawing Sheets

(56) References Cited

U.S. PATENT DOCUMENTS

| | | | |
|---|---|---|---|
| 2002/0047895 A1* | 4/2002 | Bernardo | G01C 11/02 |
| | | | 348/48 |
| 2010/0271365 A1* | 10/2010 | Smith | G06T 13/40 |
| | | | 345/419 |
| 2012/0147012 A1* | 6/2012 | Lau | G06T 13/00 |
| | | | 345/473 |
| 2014/0340409 A1* | 11/2014 | Murphy-Chutorian | |
| | | | G06T 13/80 |
| | | | 345/473 |
| 2015/0130799 A1* | 5/2015 | Holzer | G06F 3/04842 |
| | | | 345/420 |
| 2015/0130894 A1* | 5/2015 | Holzer | G06F 3/04842 |
| | | | 348/36 |
| 2016/0080725 A1 | 3/2016 | Barnes | |
| 2016/0189415 A1 | 6/2016 | Srinivasan | |
| 2016/0328827 A1* | 11/2016 | Ilic | H04N 5/2624 |
| 2017/0060857 A1 | 3/2017 | Imbruce | |
| 2017/0293997 A1* | 10/2017 | Cabral | G06T 3/4038 |
| 2018/0096217 A1* | 4/2018 | Moshfeghi | G01S 5/0263 |

\* cited by examiner 210  220  230

COMPOSITED ANIMATION

TECHNICAL FIELD

This disclosure generally relates to generating an animation that portrays an image from two or more different perspectives.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device-such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, one or more computing devices may create a composited animation based on two or more images, wherein the animation comprises a shifting-perspective animation. As an example and not by way of limitation of such a composited animation and the process by which it may be generated, a first user may capture a self-portrait image (e.g. take a "selfie") on top of the Space Needle in Seattle, Wash. The user may trigger a process for generating a composited (or shifting-perspective) animation process in any suitable manner. In response, a communication system (e.g., a social-networking system) may generate the shifting-perspective animation. To continue the example, the shifting-perspective animation may comprise the selfie image of the user at the top of the Space Needle, and then may show an animation in which the view of the user zooms out so that it appears that the photo of the user was taken from 100 feet away from the platform of the Space Needle. It may appear that the camera capturing the final frame in the animation is floating in midair or is affixed to a flying drone. Thus, the animation may begin with an image of the user taken from a first perspective, and end with an image of the user that appears to have been taken from a different perspective. This may be why this disclosure refers to the animation as a "shifting-perspective animation." The communication system may create the shifting-perspective animation by (1) receiving a trigger to begin the process of generating a shifting-perspective animation; (2) receiving at least two images captured by one or more cameras, wherein a first image of the at least two images comprises a subject and a second image of the at least two images comprises a perspective of the geographic location that is different than the first image; (3) identifying, from the at least two images, an object that is common to the at least two images; (4) computing a difference in perspective between the at least two images that is based at least in part on a difference in size and shape between the object in the first image and the geometric object in the second image; (5) generating, based on the difference in perspective, an animation to illustrate a transition from the first image to the second image, wherein the animation comprises both the first image and the second image, and wherein the animation adds a modified version of the subject to the second image; and (6) sending instructions to a client system of a user to display the animation on a display screen of the client system.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
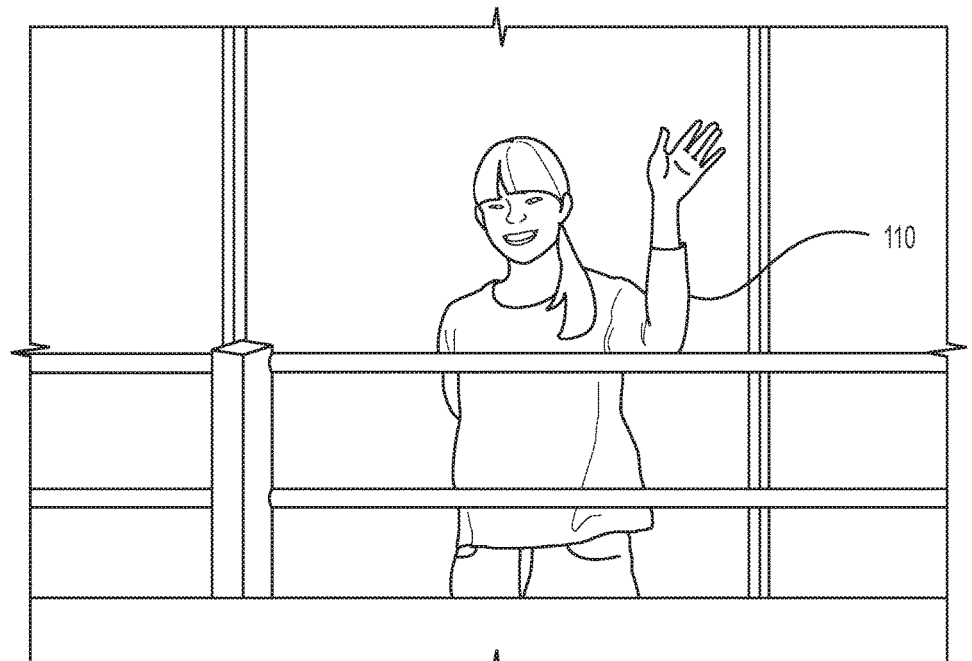
FIGS. 1A-1D illustrate an example shifting-perspective animation.

In particular embodiments, one or more computing devices may create an animation based on two or more images, wherein the animation comprises a shifting-perspective animation. In particular embodiments, the one or more computing devices may be server-side computing machines maintained by a communication system or a social-networking system. In particular embodiments, the one or more computing devices may be one or more client systems associated with one or more users of the communication system or social-networking system. As an example and not by way of limitation, a first user may capture a self-portrait image (e.g. take a "selfie") on top of the Space Needle in Seattle, Wash. The user may trigger a process for generating a shifting-perspective animation process in any suitable manner. In response, a communication system (e.g., a social-networking system) may generate the shifting-perspective animation. To continue the example, the shifting-perspective animation may comprise the selfie image of the user at the top of the Space Needle, and then may show an animation in which the view of the user zooms out so that it appears that the photo of the user was taken from 100 feet away from the platform of the Space Needle. It may appear that the camera capturing the final frame in the animation is floating in midair or is affixed to a flying drone. Thus, the animation may begin with an image of the user taken from a first perspective, and end with an image of the user that appears to have been taken from a different perspective. This may be why this disclosure refers to the animation as a "shifting-perspective animation." The communication system may create the shifting-perspective animation by (1) receiving a trigger to begin the process of generating a shifting-perspective animation; (2) receiving at least two images captured by one or more cameras, wherein a first image of the at least two images comprises a subject and a second image of the at least two images comprises a perspective of the geographic location that is different than the first image; (3) identifying, from the at least two images, an object that is common to the at least two images; (4) computing a difference in perspective between the at least two images that is based at least in part on a difference in size and shape between the object in the first image and the geometric object in the second image; (5) generating, based on the difference in perspective, an animation to illustrate a transition from the first image to the second image, wherein the animation comprises both the first image and the second image, and wherein the animation adds a modified version of the subject to the second image; and (6) sending instructions to a client system of a user to display the animation (e.g., as an animation object) on a display screen of the client system. An animation object may be understood to be a content object that comprises an animation, which may be the shifting-perspective animation. The animation object may be associated with social-networking data, such as user interaction, that may be displayed as users interact with the animation object (e.g., likes, reactions, shares, and comments may be displayed along with usernames of users who interacted with the animation object). Although this disclosure describes various methods and processes performed by a social-networking system, this disclosure contemplates the methods and processes described herein as being performed by any suitable communication network and not necessarily by a social-networking system. Although this disclosure discusses the generated animation as a shifting-perspective animation, the generated animation may also be considered to be a composited animation, because the animation may generally be made up of two or more images. Thus, "composited animation" and "shifting-perspective animation" may both be considered to refer to an animation that is generated from two or more images.

Figure 1B:
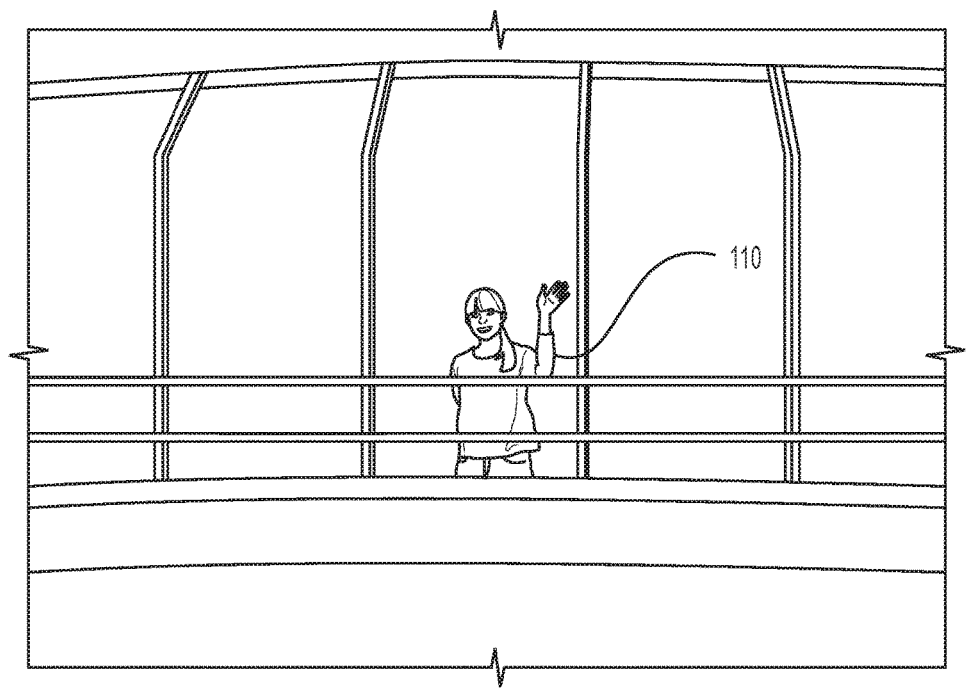
Figure 1C:
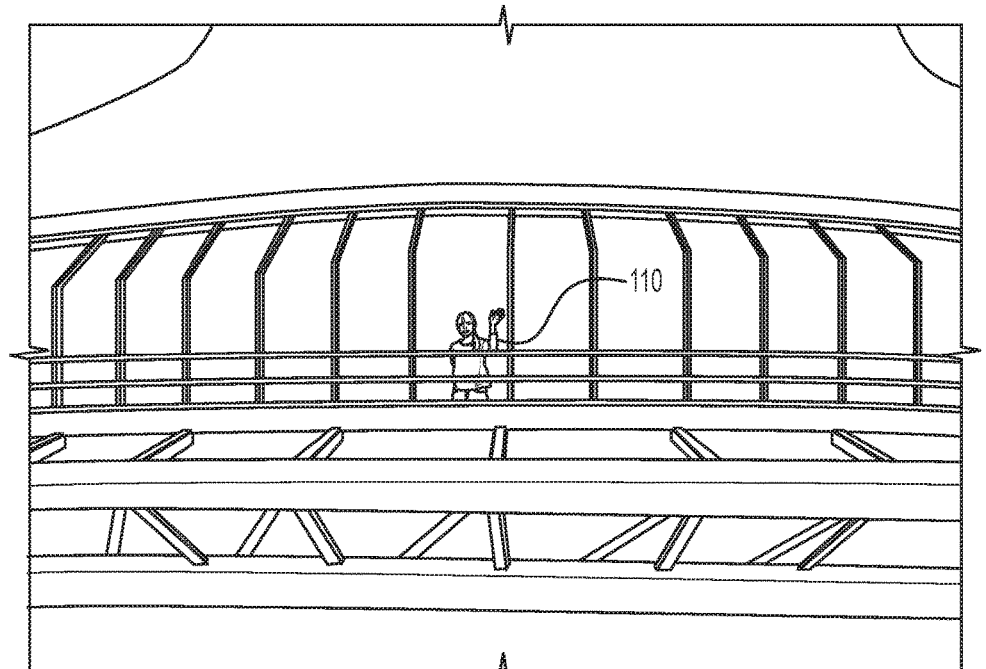

FIGS. 1A-1D illustrate an example shifting-perspective animation. FIG. 1A illustrates an example image. In particular embodiments, this image may be taken by a user and sent to the social-networking system. This image may be taken by the user directly (e.g., a "selfie") or may be taken by a third party (e.g., another person or by an in-venue camera). This image may be used as a first image in the shifting-perspective animation. FIGS. 1B and 1C may be example "animation" images that are part of the animation generated by the social-networking system in response to the trigger. Although this disclosure illustrates two example animation images, this disclosure contemplates shifting-perspective animations that comprise many more images, such as twenty or more images. These intermediate images may be generated by the social-networking system to show a smooth transition between the first image and the last image. In this example, the last image is FIG. 1D. This may be a second image either sent to the social-networking system by the user, or may have been uploaded previously by the user or by a different user or entity. As an example and not by way of limitation, an administrator of the Space Needle may have uploaded the image of FIG. 1D (without user 110) as part of marketing material or for the express purpose of using it in shifting-perspective animations. Although this disclosure describes a particular shifting-perspective animation with particular images, this disclosure contemplates any suitable shifting-perspective animation with any suitable images.

In particular embodiments, the social-networking system may receive a trigger to begin the process of generating a shifting-perspective animation. The trigger to begin the process of generating a shifting-perspective animation may be any suitable action, including messaging a dedicated bot that is programmed to receive images and facilitate the animation template process, by posting the image to the online social network and providing as a comment a particular hashtag, by the user being located in a particular geographic region, or by any other suitable means. As an example and not by way of limitation, the image may be a selfie of Alex standing on top of the Space Needle in Seattle, Wash. In the example of the user triggering the animation template process by providing a particular hashtag, Alex may send the image to the social-networking system with the hashtag #SpaceNeedleSelfie, which may be the hashtag designated by the social-networking system to trigger the process for generating a shifting-perspective animation. In particular embodiments, the photo may be taken by an in-venue camera instead of a client system associated with a user. In such a situation, an in-venue camera may be set up in a location to take a photo. The in-venue camera may be associated with a matrix barcode (e.g., a QR CODE) that a user may scan and send to the social-networking system. In particular embodiments, an automated messaging bot may simply create a mutual-message thread with the user and the social-networking system when the user's client system sends the matrix barcode to the social-networking system, or, in particular embodiments, when the user's client system moves to within a threshold proximity of a wireless beacon.

When the user sends the barcode to the social-networking system, or otherwise properly triggers the process, the in-venue camera may capture the image and send the image to the social-networking system for processing. Although this disclosure describes receiving an image from a client system in a particular manner, this disclosure contemplates receiving an image from a client system in any suitable manner.

In particular embodiments, the trigger for starting the animation template process may be made without the social-networking system receiving an image. In particular embodiments, the animation template process may be triggered when a user's client system is located within a threshold distance from a wireless beacon device (e.g., a Bluetooth device, a Wi-Fi router). The social-networking system may detect that a user is within a threshold distance of a poster or other content item or media space. Detection may be made by GPS data or by Bluetooth or other NFC detection. As an example and not by way of limitation, the social-networking system may receive an indication that a user has just connected with a Bluetooth or Wi-Fi signal associated with a media space or content item. In particular embodiments, when the social-networking system receives the trigger, it may send a notification or message to the user, inviting the user to begin the animation template process. As an example and not by way of limitation, a user, Amy, may come within a threshold distance (e.g., 25 feet) of a wireless beacon device at the top of the Space Needle. The social-networking system may detect this using any one or more of the methods described herein and may send a message to a client system associated with Amy. The message may say, "Amy, take an 'Impossible Selfie' to share with your friends." Reply yes for instructions." Alternatively, Amy may select to receive more instructions by tapping an appropriate icon on the message. If Amy chooses to receive more instructions, the social-networking system may instruct her to position herself appropriately for a shifting-perspective animation. As an example and not by way of limitation, the social-networking system may send instructions to Amy's client system that says "Stand with both feet on the 'X' at the north-west corner of the space needle, facing out." The social-networking system may then instruct Amy to take a photo or a short video, or it may instruct Amy to pose for a photo that is taken by an in-venue camera. Although this disclosure describes a particular animation process carried out in a particular manner, this disclosure contemplates any suitable animation process carried out in any suitable manner.

In particular embodiments, the social-networking system may receive at least two images captured by one or more cameras, wherein a first image of the at least two images comprises a subject and a second image of the at least two images comprises a perspective of the geographic location that is different than the first image. The first image may be an image generated by a user of the online social network. The first image may comprise a subject, and the subject may be a user of the online social network. As an example and not by way of limitation, the first image may be a selfie image of a user Amy standing at the top of the Space Needle in Seattle, Wash. As another example and not by way of limitation, the first image may be of a user's dog on the Huntington Beach Pier in Huntington Beach, Calif. In particular embodiments, the first image may comprise a subject that is an object, such as a food item at a restaurant, or a vehicle driving along Pacific Coast Highway. In particular embodiments, the second image may comprise a perspective of a geographic location that is different than the first image. The second image may have been taken simultaneously or close to simultaneously with the first image, or may have been taken prior to the first image (e.g., one month before, one year before, or even 50 years before the first image was taken). Continuing with the above examples, the second image may be an image of the Space Needle taken 100 feet away from the Space Needle at the same altitude as the top of the Space Needle. As another example, the second image may be an image of the Huntington Beach Pier taken 150 feet away from the pier at an altitude that is 50 feet above the pier. Such an image may have been captured by a drone or helicopter. As another example and not by way of limitation, the second image may be a bird's eye view of Pacific Coast Highway (with or without the car in the first image) taken at an altitude of 200 feet. In particular embodiments, the second image does not need to be of the same location as the first image. The generated shifting-perspective animation may shift to an entirely different location. As an example and not by way of limitation, the first image may be a selfie image of a user at the top of the Space Needle, and the second image may be a selfie image of the same user standing in front of the Pyramids in Egypt. The following table may summarize these examples for easier comprehension.

TABLE 1

Example First and Second Images

| No. | First Image | Second image |
| --- | --- | --- |
| 1 | Selfie of a user standing at the top of the Space Needle | Aerial shot of the Space Needle taken 100 feet away at the same altitude as the top of the Space Needle |
| 2 | Photo of a dog on the Huntington Beach Pier | Aerial shot of the Huntington Beach Pier taken 150 feet out from the pier and 50 feet above the pier. |
| 3 | Photo of a car driving along Pacific Coast Highway | Bird's eye shot of Pacific Coast Highway taken at an altitude of 200 feet. |
| 4 | Selfie of a user standing at the top of the Space Needle | Selfie of the same user standing in front of the Pyramids in Egypt |

In particular embodiments, the social-networking system may identify, from the at least two images, an object that is common to the at least two images. The identification may be made using object recognition. The object may take the form of a geometric shape (e.g., a rectangular window) or may not have any particular shape (e.g., a rock). As an example and not by way of limitation, the object may be a rectangle located behind or in front of the user on the Space Needle. In particular embodiments, the object may comprise a planar front surface that comprises a polygon. The planar surface may be a wall paneling or a window or any other suitable planar surface. If the object does not have any defined polygon-like shape, the social-networking system may still use this object to create the shifting-perspective animation. As an example and not by way of limitation, if the first image is a selfie image of a user at Joshua Tree National Park, and the only objects in the image are rocks and cactuses, and the second image is an aerial shot of a rock formation at Joshua Tree that only comprises rocks and cactuses, the social-networking system may identify a particular rock that is common to the at least two images. Note that if the two images are of different locations such as those in example four above, the social-networking system may not identify an object that is common to both images. The social-networking system may make this determination using metadata associated with the images that specifies where the images were taken (e.g., a geo-tag). Although this disclosure describes identifying an object in a particular manner, this disclosure contemplates identifying an object in any suitable manner.

Figure 1D:
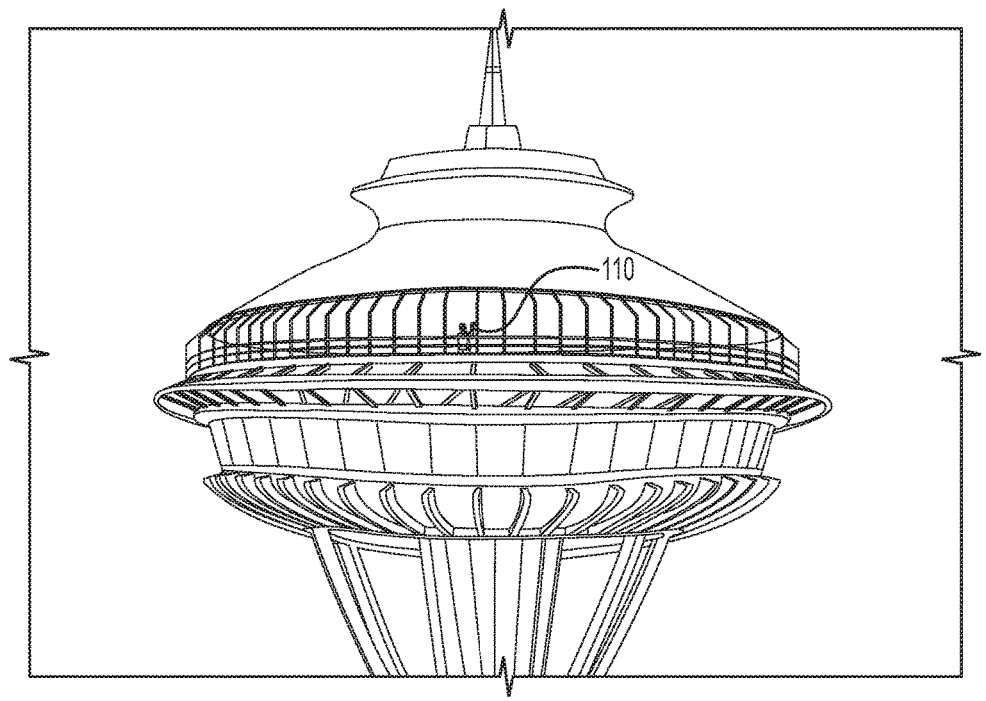
Figure 2:
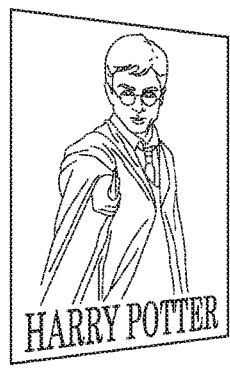
FIG. 2 illustrates three example images that may be used to create a shifting-perspective animation.
Figure 2:
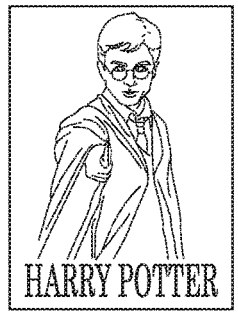
Figure 2:

In particular embodiments, the social-networking system may compute a difference in perspective between the at least two images that is based at least in part on a difference in size and shape between the object in the first image and the geometric object in the second image. The difference in perspective may be determined by measuring a size difference between one or more parts of the object common to the at least two images. As an example and not by way of limitation, with reference to FIGS. 1A-1D, the object may be one of the rectangles that are located near the subject 110. The object may occupy 100×300 pixels in FIG. 1A, and 10×30 pixels in FIG. 1D. The social-networking system may use this information to compute the difference in perspective when rendering the subject in the final and intermediate images. Continuing with the example, the social-networking system may scale the subject 110 by a factor of 10, and to provide the intermediate animation (e.g., the images that comprise the intermediate animation) with the subject also scaled appropriately. In particular embodiments, scaled, angled, and any other modification to the subject may be referred to as a transformation of the subject. In other words, if the subject has been "transformed," the subject may have been scaled, may have been tilted, or may have been scaled and tilted. Tilted may mean that the image may be processed such that the subject appears to have been positioned at an angle with respect to the camera that captured the image. This is illustrated and discussed by FIG. 2 and the accompanying discussion. As an example and not by way of limitation, the social-networking system may generate 20 frames that may comprise the animation that is displayed between FIG. 1A and FIG. 1D. Each frame may show the subject and the background (e.g., the objects that make up the Space Needle) as being scaled down by a continuous scaling factor (e.g., each frame shows the image and background 5% smaller than the frame preceding it). The scaling of each frame may produce an animation that appears to "zoom out" from the scene depicted in FIG. 1A until it arrives at the scene depicted in FIG. 1D. In particular embodiments the computation may involve more than a straightforward zoom out. As an example and not by way of limitation, the first image may be taken from a particular angle (e.g., straight-on) and the second image may be of the same location but taken at a different angle (e.g., offset at an angle of 45°). The social-networking system may determine the difference between the two angles by computing the difference between the object in the first image and the object in the second image. As an example and not by way of limitation, a rectangle photographed from straight-on may have parallel top and bottom sides, and the left and right sides may be the same length. However, a rectangle photographed from an angle of 45° may have top and bottom sides that are skewed and the left and right sides may appear to have different lengths. As an example and not by way of limitation, FIG. 2 illustrates three different photographs of the same Harry Potter poster. Poster 220 may have been taken from straight on, and posters 210 and 230 may have been taken at different angles. This may illustrate the difference in perspective that the social-networking system may compute by calculating the difference between the appearance of posters 210, 220, and 230. Although this disclosure describes computing a difference in perspective between two images in a particular manner, this disclosure contemplates computing a difference in perspective between two images in any suitable manner.

In particular embodiments, the social-networking system may generate, based on the difference in perspective, an animation to illustrate a transition from the first image to the second image, wherein the animation comprises both the first image and the second image, and wherein the animation adds a modified version of the subject to the second image. The animation may comprise the first image as the first image in the animation and the second image as the last image in the animation. Alternatively, the animation may be reversed (e.g., as a "zoom-in" of the example images of FIGS. 1A-1D), with the second image being the first image in the animation, and the first image being the last image in the animation. The animation may comprise a plurality of intermediate images that are based on either the first image or on the second image, or both the first image and the second image. The intermediate images may be displayed in succession so as to show a smooth transition between the first image in the animation and the last image in the animation. They may be displayed at a sufficiently fast frame rate (e.g., 30 frames per second) to illustrate the smooth transition. The animation may comprise a modified version of the subject. A modified version of the subject may be a scaled version of the subject, as shown in FIGS. 1B, 1C, and 1D, or may be a tilted version of the subject as shown by the HARRY POTTER figure in FIG. 2 (discussed below). In particular embodiments, the animation may comprise a subject that has been both scaled and tilted, if that is appropriate based on the difference in perspective between the first and second images. Although this disclosure describes generating an animation in a particular manner, this disclosure contemplates generating an animation in any suitable manner.

In particular embodiments, the social-networking system may adjust for differences between the first image and the second image, or between each of the images if the shifting-perspective animation is generated based on more than two images. Adjustments that the social-networking system may make include lighting adjustments, depth-of-field adjustments, saturation adjustments, white balance adjustments, ISO adjustments, or any other suitable adjustment. The purpose of making such adjustments to either the first image or the second image (or any of the other images if applicable) may be to create a realistic and uniform animation. As an example and not by way of limitation, a user Amy may take a photo of herself at the top of the Space Needle on a cloudy day. This may be the "first image." The "second image" may have been taken months before Amy captured the first image, and the second image may show the Space Needle from 100 feet away, but on a sunny day. Thus, these two images will have differences in lighting, color, ISO, and so on. The social-networking system may analyze each image and make adjustments to one or both images such that their lighting, color, ISO, white balance, etc. appear to be similar. Thus, the resulting images in the shifting-perspective animation may appear to have all been captured on the same day in the same environment. In particular embodiments, one way to determine the adjustments that need to be made may be to calculate the averages between the photos in each of several different categories, and then adjust each photo to substantially match the averages in each category. As an example and not by way of limitation, the first image may be an RGB photo with the following values: Red: 24; Green: 102: Blue: 68. The second image may be an RGB photo with the following values: Red: 16; Green: 111; Blue: 74. Thus, the average color balance between the first image and the second image may be Red: 20; Green: 106 (rounded down from 106.5); and Blue: 71. Analogous processes may be performed for other categories, such as white balance and ISO levels. Although this disclosure describes adjusting for differences in images in a particular manner, this disclosure contemplates adjusting for differences in any suitable manner.

FIG. 2 illustrates three example images that may be used to generate a shifting-perspective animation. In particular embodiments, the shifting-perspective animation may comprise a change in perspective. A change in perspective may be understood to mean that the perceived camera angle appears to shift from a first viewpoint to at least one other viewpoint during the animation sequence. In the example of FIG. 2, poster 210 depicts a HARRY POTTER movie poster that appears to be taken from the left side of the movie poster. Poster 220 depicts the HARRY POTTER movie poster that appears to be taken directly in front of the movie poster. Poster 230 depicts the HARRY POTTER movie poster that appears to have been taken from the right side of the movie poster. The social-networking system may require a user to send a first image and at least one other image in order to generate an animation that has a changing perspective, or the social-networking system may generate an animation that has a changing perspective from a single image using computer graphics rendering techniques. In particular embodiments, the social-networking system may receive a first image. As an example and not by way of limitation, the social-networking system may receive an image of a HARRY POTTER movie poster as shown by poster 220. In particular embodiments, the social-networking system may receive a second image from the client system, wherein the second image was captured from a perspective that is different from the first image. As an example and not by way of limitation, the social-networking system may receive an image of the HARRY POTTER movie poster as shown by poster 210. In particular embodiments, the social-networking system may identify, from the at least two images, a geometric object that is common to the at least two images. As an example and not by way of limitation, a geometric object common to Poster 210 and poster 220 may be the outline of the movie poster (e.g., a rectangle). In particular embodiments, the social-networking system may compute a difference in perspective between the at least two images that is based at least in part on a difference in size and shape between the geometric object in the first image and the geometric object in the second image. As an example and not by way of limitation, the social-networking system may process the two images depicted by Posters 210 and 220 to determine that the difference in perspective between the two images is 45°. In other words, if the sending user was standing directly in front of the movie poster when she captured the image depicted by poster 220, then the sending user was standing a few feet to the left of the movie poster such that the resulting change in perspective is 45°. In particular embodiments, the social-networking system may generate, based on the difference in perspective, a shifting-perspective animation to show a transition from the first image to the second image, wherein the shifting-perspective animation comprises the first image, the second image, and the animation. The animation may comprise several images that show what appears to be a smooth transition from the first image to the second image, as if the image capture device was capturing a video of the subject as it rotated around the subject. Although this disclosure describes generating an animation in a particular manner, this disclosure contemplates generating an animation in any suitable manner.

In particular embodiments, the social-networking system may send instructions to a client system of a user to display the animation on a display screen of the client system. The user may save the animation to her client system or she may post it to the online social network. The user may also send the animation to her friends. Although this disclosure describes sending instructions to a client system in a particular manner, this disclosure contemplates sending instructions to a client system in any suitable manner.

In particular embodiments, the social-networking system may detect that it generated a similar animation for another user who is friends with or otherwise shares a first-degree connection with the first user. Two animations may be similar if they share a geographic location or comprise the same subject (e.g., the same user in a group of users). As an example and not by way of limitation, the social-networking system may determine that it generated an animation for another user, Jacob, who is friends with the user Amy, and the animations it created for both Jacob and Amy share a common location: the Space Needle in Seattle, Wash. In response to this determination, the social-networking system may send a message to either or both of Amy and Jacob to notify them that one of their friends had the same animation generated. As an example and not by way of limitation, the message to Jacob may say, "Jacob, your friend Amy also took an Impossible Selfie at the Space Needle. Tap to see it." This may increase user-engagement with the online social network. Although this disclosure describes detecting a similar animation in a particular manner, this disclosure contemplates detecting a similar animation in any suitable manner.

In particular embodiments, the social-networking system may track all the animations that are generated for a given geographic location. As an example and not by way of limitation, the social-networking system may count how many shifting-perspective animations were generated for the Space Needle, for the Pyramids in Egypt, for the Statue of Liberty, for Delicate Arch in Arches National Park in Utah, and for any number of additional locations for shifting-perspective animations. The social-networking system may additionally track one or more user-engagement metrics associated with posts comprising shifting-perspective animations for each discrete location. User engagement may be measured by the number of edge connections a particular content object has. As an example and not by way of limitation, a user-engagement metric may be the total number of likes a post has, the number of shares a photo has, or any other suitable measurement for any suitable content object. A post comprising the shifting-perspective animation may be considered to be a content object. Edge connections, as explained below, may be formed when other users of the online social network like, comment on, share, or otherwise interact with the content object. The social-networking system may track the locations that are associated with posts comprising shifting-perspective animations that have the most edge connections, and thus the most user engagement. The social-networking system may identify one or more geographic locations that are associated with shifting-perspective animations that have a high user engagement (e.g., a number of edge connections above a threshold number of connections). Upon identifying these locations, the social-networking system may access a user's social graph to determine to send a recommendation to the user regarding creating a shifting-perspective animation at a popular geographic location. As an example and not by way of limitation, the social-networking system may determine that the Big Basin Redwood Forest is associated with shifting-perspective animations that have a high level of user engagement (e.g., nodes corresponding to posts comprising shifting-perspective animations in the Big Basin Redwood Forest average over 100 edge connections each). The social-networking system may access a user's social graph and determine that the user is planning on attending an event in one week called "Hike Skyline to Sea at Big Basin." From this, the social-networking system may determine that the user will be located in the Big Basin Redwood Forest. In response, the social-networking system may send the user a recommendation to make a shifting-perspective animation by following the procedures explained herein. For example, the message may say, "Kevin, take an Impossible Selfie when you are in Big Basin next weekend. Click here to see how it works." Alternatively, the social-networking system may wait to send the message until the user is within the vicinity of the Big Basin Redwood Forest to send the message. Although this disclosure describes tracking information related to shifting-perspective animations in a particular manner, this disclosure contemplates tracking information related to shifting-perspective animations in any suitable manner.

In particular embodiments, the social-networking system may apply other animations to the shifting-perspective animation. The other animations may be "special effects" such as changing text, blinking lights, or any other suitable animation. The animations may be determined by the social-networking system searching through a database of animation templates. In particular embodiments, a method may provide for applying one or more animation templates to an image or video. In particular embodiments, a user of a social-networking system may capture an image or video and send it to the social-networking system for processing (e.g., the first image as discussed herein). The social-networking system may analyze the image or video and identify a media space within the image. The media space may have one or more content items. The social-networking system may recognize these content items and apply one or more animation templates to the image or video based on (1) the recognized content item(s), and (2) social networking data associated with the user who captured the image or video and sent it to the social-networking system. The social-networking system may then send the animation to the user. As an example and not by way of limitation, a user, Tim, may take a photo of a media space that comprises a content item. In this example the media space may be a wall and the content item may be a movie poster for the movie Terminator, starring Arnold Schwarzenegger. Tim may send this photo to the social-networking system either as a message or by posting it to the online social network maintained by the social-networking system. The social-networking system may analyze the photo and recognize (e.g., via object recognition) that it contains the Terminator movie poster. The social-networking system may have stored on its servers one or more animation templates associated with the Terminator movie poster. If only one animation template for the Terminator movie is available, the social-networking system may select the animation template and apply it to the image in the location on the image where the movie poster is located. In this example, the animation template may comprise flashing lasers to be situated in the corner of the movie poster as well as red Terminator eyes that flash periodically. The animation template may further comprise flashing text that says "I'll be back." The social-networking system may apply the animation template to the photo in the area where the Terminator movie poster is located so that the movie poster appears to have lasers, flashing red eyes, and changing text. The social-networking system may send the image and the animation template as a single animation object to the user. The user may then post the animation object to the online social network, send the animation object to friends, or perform any other suitable function with the animation object. Although this disclosure describes applying particular animations to the shifting-perspective animation in a particular manner, this disclosure contemplates applying any suitable animations to the shifting-perspective animation in any suitable manner.

In particular embodiments, the first image may have been taken in a populous area. For example, the Space Needle often has several dozen people in close proximity on its top-most platform. As a result, the first image or second image may have crowds of people in them. This may be undesirable for a user who wishes to generate a shifting-perspective animation. Thus, the social-networking system may employ techniques to remove crowds from the images. The social-networking system may recognize the user via face recognition software and then remove the people whose faces do not match that of the user's face. In particular embodiments, the social-networking system may "crowd-source" the first image or the second image. Crowd-sourcing the image may mean to take several images of the same geographic location to create a composite image that has no extra people in it, or that has unwanted elements (e.g., utility poles, telephone lines) removed. In particular embodiments, the social-networking system may use images stored in association with the online social network to generate a better shifting-perspective animation than would be possible with only the first image and the second image. As an example and not by way of limitation, there may be several thousand pictures of the Golden Gate Bridge stored by or in association with the social-networking system. The social-networking system may take all these images and create a 360° view of the Golden Gate Bridge. The shifting-perspective animation may start with a first image of a user standing on the Golden Gate Bridge and may proceed with displaying a zoom-out animation of the Golden Gate Bridge along with a 360° circling view of the Bridge. This may be created by leveraging all the photos of the Golden Gate Bridge that were uploaded to the online social network. Although this disclosure describes generating a particular animation in a particular manner, this disclosure contemplates generating any suitable animation in any suitable manner.

In particular embodiments, the social-networking system may generate a shifting-perspective animation by using images captured from various locations in a room. To illustrate this concept, imagine that it is a user's birthday. The user may have a birthday cake. A camera may be positioned on the birthday cake as if it were one of the candles. The social-networking system may use facial recognition to recognize when the user is approaching the birthday cake (e.g., to blow out the candles). When it detects that the user is approaching the birthday cake, the social-networking system may send instructions to the camera to begin recording. As the user is blowing out the candles, a second user may take a photo of the birthday user. This may photo may be taken from any angle (e.g., directly in front of the user, from the side). The photo taken by the camera on the birthday cake may be the first image and the photo taken by the second user may be the second image. The social-networking system may then generate a shifting-perspective animation that transitions from the first image to the second image. As another example and not by way of limitation, imagine going to a restaurant or other location with a private or semi-private room. The room may be rigged with several cameras on the walls, tables, and so forth. The cameras may periodically take photos and videos throughout the evening. In particular embodiments, the cameras may be triggered by laughter or by another other suitable trigger. The social-networking system may take these photos and videos and generate one or more shifting-perspective animations that each comprises one or more of the images and videos captured during the evening. In particular embodiments, more than two cameras may capture multiple images. In this case, the shifting-perspective animation may comprise more than a zoom-in, zoom-out, or pan from side-to-side. The shifting-perspective animation may also comprise tilting effects, three-dimensional effects, or any other suitable effect made possible with multiple images of an object or scene taken from multiple angles. As an example and not by way of limitation, the social-networking system may be able to determine distances between objects and people in a restaurant rigged with several cameras, when the cameras have captured many images. The social-networking system may use this information to create a three-dimensional rendering of the environment and generate one or more shifting-perspective animations that have three-dimensional effects. Although this disclosure describes generating a particular animation in a particular manner, this disclosure contemplates generating any suitable animation in any suitable manner.

Figure 3:
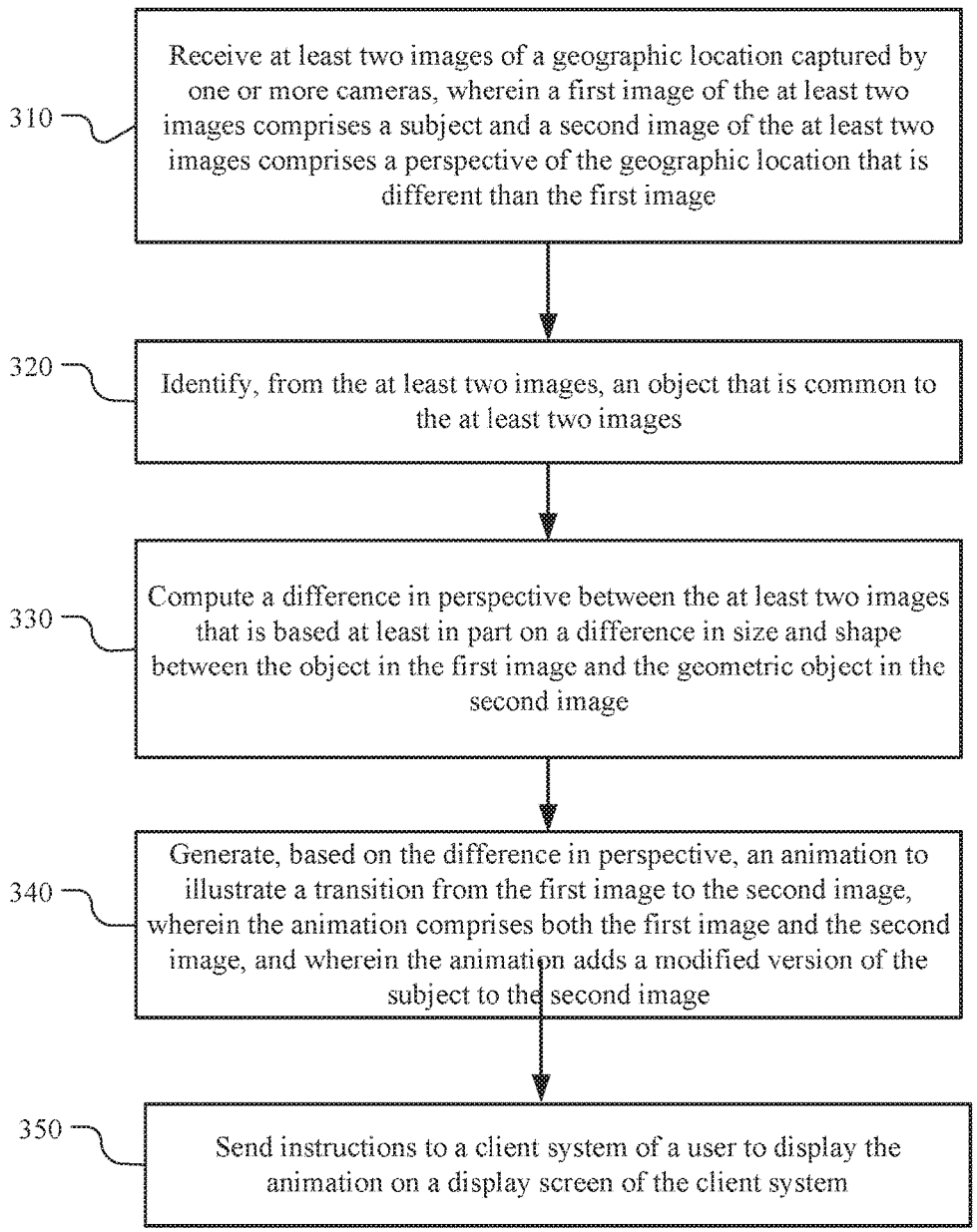
FIG. 3 illustrates an example method for generating a shifting-perspective animation based on one or more user-generated images.

FIG. 3 illustrates an example method 300 for generating a shifting-perspective animation based on one or more user-generated images. The method may begin at step 310, where the social-networking system may receive at least two images of a geographic location captured by one or more cameras, wherein a first image of the at least two images comprises a subject and a second image of the at least two images comprises a perspective of the geographic location that is different than the first image. At step 320, the social-networking system may identify, from the at least two images, an object that is common to the at least two images. At step 330, the social-networking system may compute a difference in perspective between the at least two images that is based at least in part on a difference in size and shape between the object in the first image and the geometric object in the second image. At step 340, the social-networking system may generate, based on the difference in perspective, an animation to illustrate a transition from the first image to the second image, wherein the animation comprises both the first image and the second image, and wherein the animation adds a modified version of the subject to the second image. At step 350, the social-networking system may send instructions to a client system of a user to display the animation on a display screen of the client system. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for creating a shifting-perspective animation based on one or more user-generated images. Including the particular steps of the method of FIG. 3, this disclosure contemplates any suitable method for creating a shifting-perspective animation based on one or more user-generated images, including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
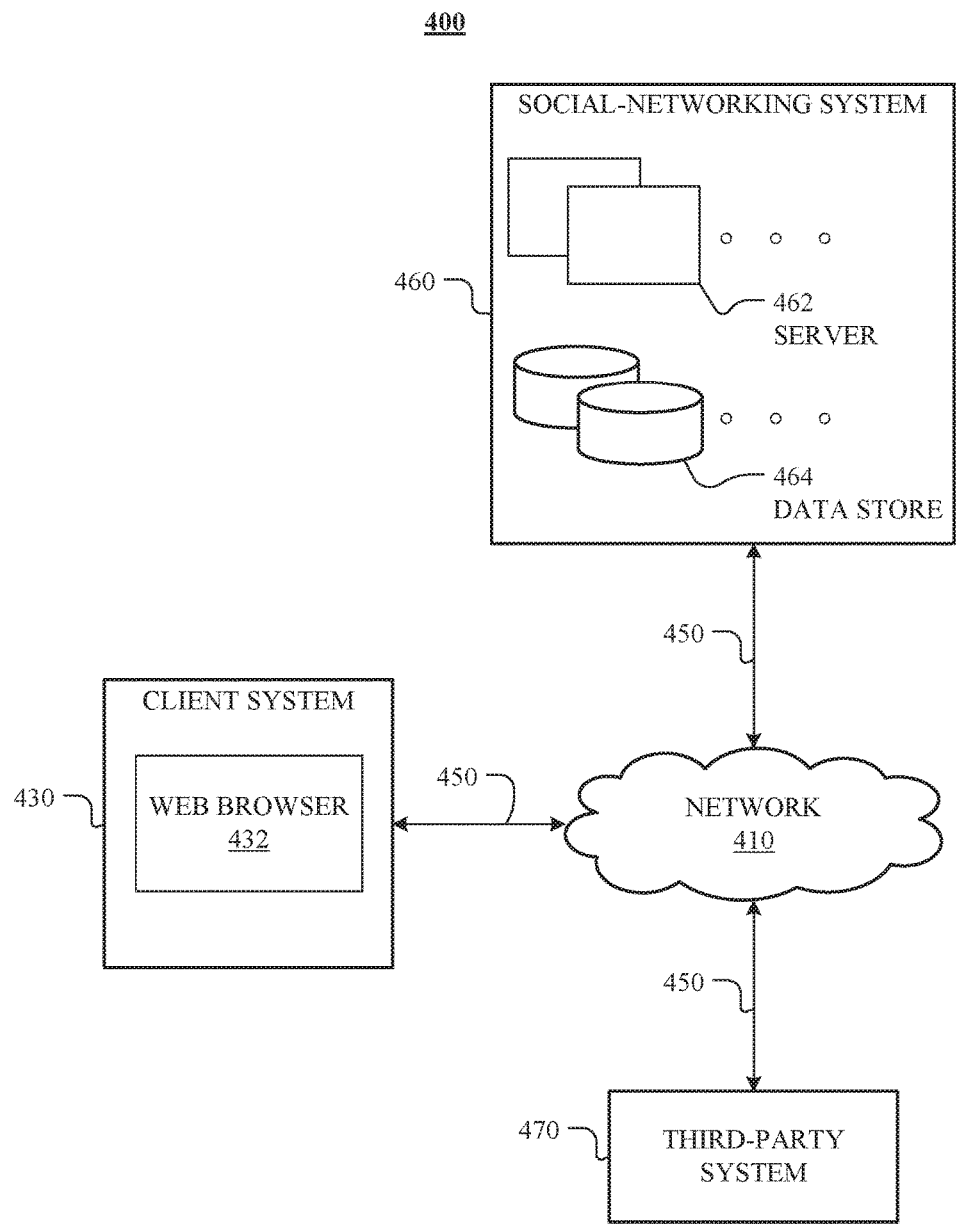
FIG. 4 illustrates an example network environment associated with a social-networking system.

FIG. 4 illustrates an example network environment 400 associated with a social-networking system. Network environment 400 includes a client system 430, a social-networking system 460, and a third-party system 470 connected to each other by a network 410. Although FIG. 4 illustrates a particular arrangement of client system 430, social-networking system 460, third-party system 470, and network 410, this disclosure contemplates any suitable arrangement of client system 430, social-networking system 460, third-party system 470, and network 410. As an example and not by way of limitation, two or more of client system 430, social-networking system 460, and third-party system 470 may be connected to each other directly, bypassing network 410. As another example, two or more of client system 430, social-networking system 460, and third-party system 470 may be physically or logically co-located with each other in whole or in part. Moreover, although FIG. 4 illustrates a particular number of client systems 430, social-networking systems 460, third-party systems 470, and networks 410, this disclosure contemplates any suitable number of client systems 430, social-networking systems 460, third-party systems 470, and networks 410. As an example and not by way of limitation, network environment 400 may include multiple client system 430, social-networking systems 460, third-party systems 470, and networks 410.

This disclosure contemplates any suitable network 410. As an example and not by way of limitation, one or more portions of network 410 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 410 may include one or more networks 410.

Links 450 may connect client system 430, social-networking system 460, and third-party system 470 to communication network 410 or to each other. This disclosure contemplates any suitable links 450. In particular embodiments, one or more links 450 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 450 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 450, or a combination of two or more such links 450. Links 450 need not necessarily be the same throughout network environment 400. One or more first links 450 may differ in one or more respects from one or more second links 450.

In particular embodiments, client system 430 may be an electronic device including hardware, software, or embedded logic components or a combination of two or more such components and capable of carrying out the appropriate functionalities implemented or supported by client system 430. As an example and not by way of limitation, a client system 430 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 430. A client system 430 may enable a network user at client system 430 to access network 410. A client system 430 may enable its user to communicate with other users at other client systems 430.

In particular embodiments, client system 430 may include a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 430 may enter a Uniform Resource Locator (URL) or other address directing the web browser 432 to a particular server (such as server 462, or a server associated with a third-party system 470), and the web browser 432 may generate a Hyper Text Transfer Protocol (HTTP) request and communicate the HTTP request to server. The server may accept the HTTP request and communicate to client system 430 one or more Hyper Text Markup Language (HTML) files responsive to the HTTP request. Client system 430 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 460 may be a network-addressable computing system that can host an online social network. Social-networking system 460 may generate, store, receive, and send social-networking data, such as, for example, user-profile data, concept-profile data, social-graph information, or other suitable data related to the online social network. Social-networking system 460 may be accessed by the other components of network environment 400 either directly or via network 410. As an example and not by way of limitation, client system 430 may access social-networking system 460 using a web browser 432, or a native application associated with social-networking system 460 (e.g., a mobile social-networking application, a messaging application, another suitable application, or any combination thereof) either directly or via network 410. In particular embodiments, social-networking system 460 may include one or more servers 462. Each server 462 may be a unitary server or a distributed server spanning multiple computers or multiple datacenters. Servers 462 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 462 may include hardware, software, or embedded logic components or a combination of two or more such components for carrying out the appropriate functionalities implemented or supported by server 462. In particular embodiments, social-networking system 460 may include one or more data stores 464. Data stores 464 may be used to store various types of information. In particular embodiments, the information stored in data stores 464 may be organized according to specific data structures. In particular embodiments, each data store 464 may be a relational, columnar, correlation, or other suitable database. Although this disclosure describes or illustrates particular types of databases, this disclosure contemplates any suitable types of databases. Particular embodiments may provide interfaces that enable a client system 430, a social-networking system 460, or a third-party system 470 to manage, retrieve, modify, add, or delete, the information stored in data store 464.

In particular embodiments, social-networking system 460 may store one or more social graphs in one or more data stores 464. In particular embodiments, a social graph may include multiple nodes—which may include multiple user nodes (each corresponding to a particular user) or multiple concept nodes (each corresponding to a particular concept)—and multiple edges connecting the nodes. Social-networking system 460 may provide users of the online social network the ability to communicate and interact with other users. In particular embodiments, users may join the online social network via social-networking system 460 and then add connections (e.g., relationships) to a number of other users of social-networking system 460 to whom they want to be connected. Herein, the term "friend" may refer to any other user of social-networking system 460 with whom a user has formed a connection, association, or relationship via social-networking system 460.

In particular embodiments, social-networking system 460 may provide users with the ability to take actions on various types of items or objects, supported by social-networking system 460. As an example and not by way of limitation, the items and objects may include groups or social networks to which users of social-networking system 460 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 460 or by an external system of third-party system 470, which is separate from social-networking system 460 and coupled to social-networking system 460 via a network 410.

In particular embodiments, social-networking system 460 may be capable of linking a variety of entities. As an example and not by way of limitation, social-networking system 460 may enable users to interact with each other as well as receive content from third-party systems 470 or other entities, or to allow users to interact with these entities through an application programming interfaces (API) or other communication channels.

In particular embodiments, a third-party system 470 may include one or more types of servers, one or more data stores, one or more interfaces, including but not limited to APIs, one or more web services, one or more content sources, one or more networks, or any other suitable components, e.g., that servers may communicate with. A third-party system 470 may be operated by a different entity from an entity operating social-networking system 460. In particular embodiments, however, social-networking system 460 and third-party systems 470 may operate in conjunction with each other to provide social-networking services to users of social-networking system 460 or third-party systems 470. In this sense, social-networking system 460 may provide a platform, or backbone, which other systems, such as third-party systems 470, may use to provide social-networking services and functionality to users across the Internet.

In particular embodiments, a third-party system 470 may include a third-party content object provider. A third-party content object provider may include one or more sources of content objects, which may be communicated to a client system 430. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 460 also includes user-generated content objects, which may enhance a user's interactions with social-networking system 460. User-generated content may include anything a user can add, upload, send, or "post" to social-networking system 460. As an example and not by way of limitation, a user communicates posts to social-networking system 460 from a client system 430. Posts may include data such as status updates or other textual data, location information, photos, videos, links, music or other similar data or media. Content may also be added to social-networking system 460 by a third-party through a "communication channel," such as a newsfeed or stream.

In particular embodiments, social-networking system 460 may include a variety of servers, sub-systems, programs, modules, logs, and data stores. In particular embodiments, social-networking system 460 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 460 may also include suitable components such as network interfaces, security mechanisms, load balancers, failover servers, management-and-network-operations consoles, other suitable components, or any suitable combination thereof. In particular embodiments, social-networking system 460 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 460 to one or more client systems 430 or one or more third-party system 470 via network 410. The web server may include a mail server or other messaging functionality for receiving and routing messages between social-networking system 460 and one or more client systems 430. An API-request server may allow a third-party system 470 to access information from social-networking system 460 by calling one or more APIs. An action logger may be used to receive communications from a web server about a user's actions on or off social-networking system 460. In conjunction with the action log, a third-party-content-object log may be maintained of user exposures to third-party-content objects. A notification controller may provide information regarding content objects to a client system 430. Information may be pushed to a client system 430 as notifications, or information may be pulled from client system 430 responsive to a request received from client system 430. Authorization servers may be used to enforce one or more privacy settings of the users of social-networking system 460. A privacy setting of a user determines how particular information associated with a user can be shared. The authorization server may allow users to opt in to or opt out of having their actions logged by social-networking system 460 or shared with other systems (e.g., third-party system 470), such as, for example, by setting appropriate privacy settings. Third-party-content-object stores may be used to store content objects received from third parties, such as a third-party system 470. Location stores may be used for storing location information received from client systems 430 associated with users. Advertisement-pricing modules may combine social information, the current time, location information, or other suitable information to provide relevant advertisements, in the form of notifications, to a user.

Figure 5:
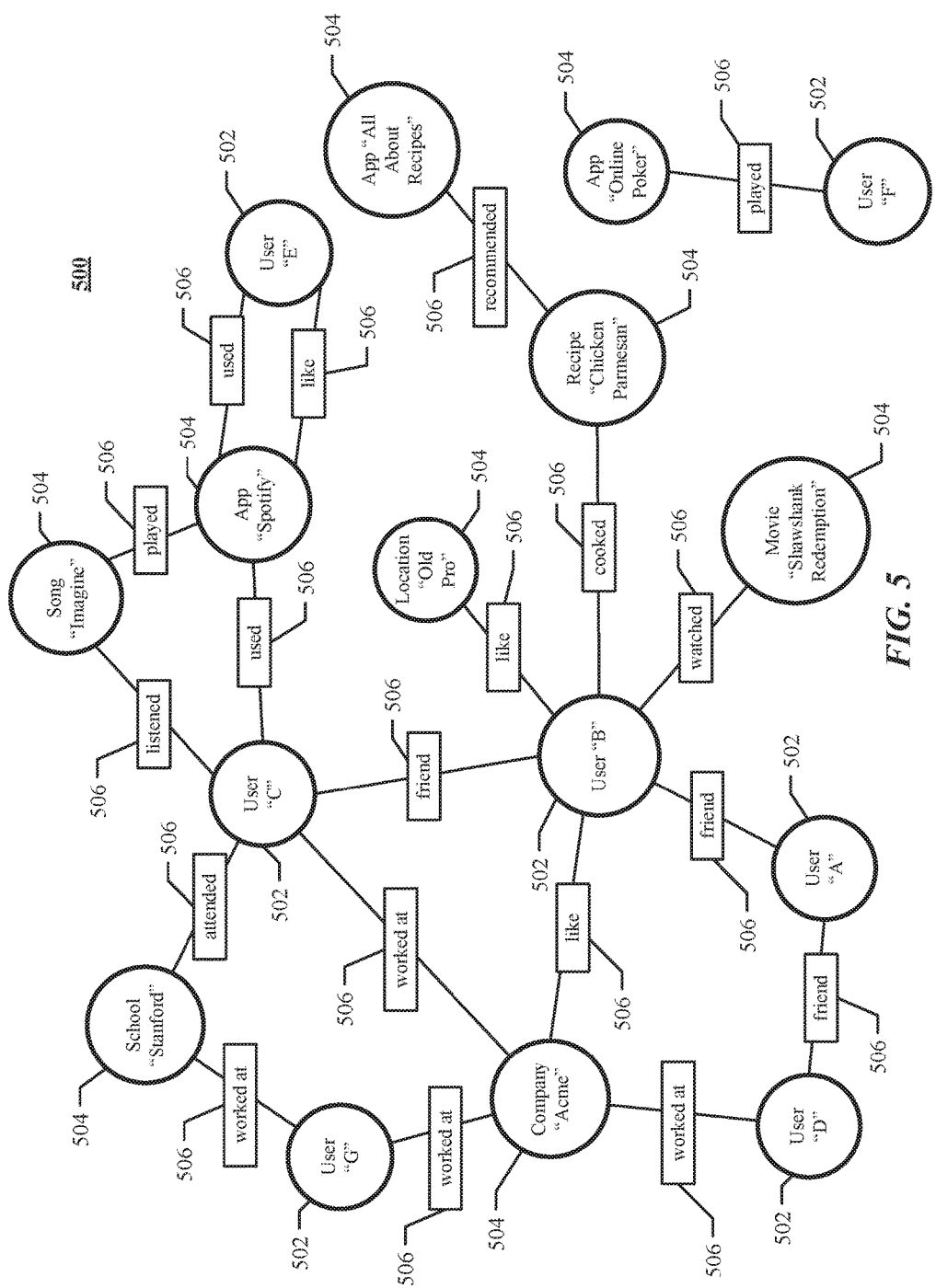
FIG. 5 illustrates an example social graph.

FIG. 5 illustrates example social graph 500. In particular embodiments, social-networking system 460 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 460, client system 430, or third-party system 470 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 460. As an example and not by way of limitation, a user may be an individual (human user), an entity (e.g., an enterprise, business, or third-party application), or a group (e.g., of individuals or entities) that interacts or communicates with or over social-networking system 460. In particular embodiments, when a user registers for an account with social-networking system 460, social-networking system 460 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 460. In particular embodiments, a user node 502 may be associated with information provided by a user or information gathered by various systems, including social-networking system 460. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 460 or a third-party website associated with a web-application server); an entity (such as, for example, a person, business, group, sports team, or celebrity); a resource (such as, for example, an audio file, video file, digital photo, text file, structured document, or application) which may be located within social-networking system 460 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 460. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 460. Profile pages may also be hosted on third-party websites associated with a third-party system 470. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 470. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 430 to send to social-networking system 460 a message indicating the user's action. In response to the message, social-networking system 460 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 460 may send a "friend request" to the second user. If the second user confirms the "friend request," social-networking system 460 may create an edge 506 connecting the first user's user node 502 to the second user's user node 502 in social graph 500 and store edge 506 as social-graph information in one or more of data stores 464. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to an edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 460 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 460 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 460 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 460 may create an edge 506 between a user node 502 and a concept node 504 in social graph 500. As an example and not by way of limitation, a user viewing a concept-profile page (such as, for example, by using a web browser or a special-purpose application hosted by the user's client system 430) may indicate that he or she likes the concept represented by the concept node 504 by clicking or selecting a "Like" icon, which may cause the user's client system 430 to send to social-networking system 460 a message indicating the user's liking of the concept associated with the concept-profile page. In response to the message, social-networking system 460 may create an edge 506 between user node 502 associated with the user and concept node 504, as illustrated by "like" edge 506 between the user and concept node 504. In particular embodiments, social-networking system 460 may store an edge 506 in one or more data stores. In particular embodiments, an edge 506 may be automatically formed by social-networking system 460 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 460). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 460 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 460) or RSVP (e.g., through social-networking system 460) to an event associated with the advertisement. In addition or as an alternative, an advertisement may include social-networking-system content directed to the user. As an example and not by way of limitation, an advertisement may display information about a friend of the user within social-networking system 460 who has taken an action associated with the subject matter of the advertisement.

In particular embodiments, social-networking system 460 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 470 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 460 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 460 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 460 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 460 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 460 may calculate a coefficient based on a user's actions. Social-networking system 460 may monitor such actions on the online social network, on a third-party system 470, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 460 may calculate a coefficient based on the user's actions with particular types of content. The content may be associated with the online social network, a third-party system 470, or another suitable system. The content may include users, profile pages, posts, news stories, headlines, instant messages, chat room conversations, emails, advertisements, pictures, video, music, other suitable objects, or any combination thereof. Social-networking system 460 may analyze a user's actions to determine whether one or more of the actions indicate an affinity for subject matter, content, other users, and so forth. As an example and not by way of limitation, if a user frequently posts content related to "coffee" or variants thereof, social-networking system 460 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 460 may calculate a coefficient based on the type of relationship between particular objects. Referencing the social graph 500, social-networking system 460 may analyze the number and/or type of edges 506 connecting particular user nodes 502 and concept nodes 504 when calculating a coefficient. As an example and not by way of limitation, user nodes 502 that are connected by a spouse-type edge (representing that the two users are married) may be assigned a higher coefficient than a user nodes 502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 460 may determine that the user has a higher coefficient with respect to the first photo than the second photo because having a tagged-in-type relationship with content may be assigned a higher weight and/or rating than having a like-type relationship with content. In particular embodiments, social-networking system 460 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 460 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 500. As an example and not by way of limitation, social-graph entities that are closer in the social graph 500 (i.e., fewer degrees of separation) may have a higher coefficient than entities that are further apart in the social graph 500.

In particular embodiments, social-networking system 460 may calculate a coefficient based on location information. Objects that are geographically closer to each other may be considered to be more related or of more interest to each other than more distant objects.

In particular embodiments, the coefficient of a user towards a particular object may be based on the proximity of the object's location to a current location associated with the user (or the location of a client system 430 of the user). A first user may be more interested in other users or concepts that are closer to the first user. As an example and not by way of limitation, if a user is one mile from an airport and two miles from a gas station, social-networking system 460 may determine that the user has a higher coefficient for the airport than the gas station based on the proximity of the airport to the user.

In particular embodiments, social-networking system 460 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 460 may provide information that is relevant to user's interests and current circumstances, increasing the likelihood that they will find such information of interest. In particular embodiments, social-networking system 460 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 460 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 460 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 470 (e.g., via an API or other communication channel), or from another suitable system. In response to the request, social-networking system 460 may calculate the coefficient (or access the coefficient information if it has previously been calculated and stored). In particular embodiments, social-networking system 460 may measure an affinity with respect to a particular process. Different processes (both internal and external to the online social network) may request a coefficient for a particular object or set of objects. Social-networking system 460 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Figure 6:
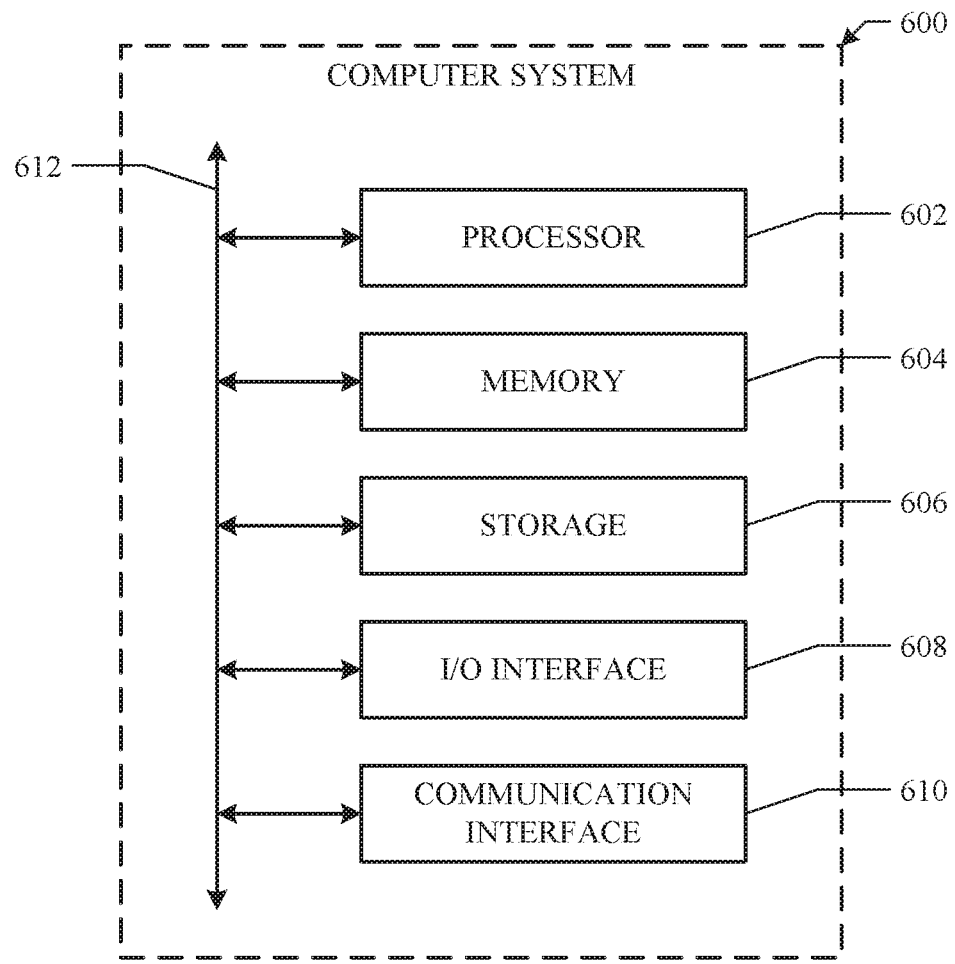
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments. I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a server computing machine:
   receiving at least two images captured by one or more cameras, wherein:
   a first image of the at least two images comprises a first perspective of a subject from a first geographic location; and
   a second image of the at least two images comprises a second perspective of the subject from a second geographic location that is different than the first geographic location;
   identifying, from the at least two images, an object that is common to the at least two images;
   computing a difference in perspective between the at least two images that is based at least in part on a difference in size and shape between the object in the first image and the object in the second image;

generating, based on the difference in perspective, a modified version of the subject;

adding, to the second image, the modified version of the subject;

generating, an animation to illustrate a transition from the first image to the second image, wherein the animation comprises both the first image and the second image; and sending instructions to a client system of a user to display the animation on a display screen of the client system.

2. The method of claim 1, wherein the subject is a user of an online social network, further comprising sending a message to the user that a first-degree connection of the user has received an animation associated with the first geographic location.

3. The method of claim 1, wherein the modified version of the subject has been transformed based on the difference in perspective.

4. The method of claim 3, wherein the transformation comprises a scaling of the subject and a tilting of the subject.

5. The method of claim 1, wherein the first image was sent by a first user in response to a prompt sent to the first user to send an image, wherein the prompt was sent based on a user-engagement metric associated with the first geographic location.

6. The method of claim 1, wherein the object that is common to the at least two images comprises a planar front surface that comprises a polygon.

7. The method of claim 1, wherein the second image is a composite image created from a plurality of images posted to an online social network, wherein each image of the plurality of images comprises a perspective of the first geographic location.

8. One or more computer-readable non-transitory storage media embodying software that is operable when executed to:

receive at least two images captured by one or more cameras, wherein:
a first image of the at least two images comprises a first perspective of a subject from a first geographic location; and
a second image of the at least two images comprises a second perspective of the subject from a second geographic location that is different than the first geographic location;

identify, from the at least two images, an object that is common to the at least two images;

compute a difference in perspective between the at least two images that is based at least in part on a difference in size and shape between the object in the first image and the object in the second image;

generate, based on the difference in perspective, a modified version of the subject;

add, to the second image, the modified version of the subject;

generate, an animation to illustrate a transition from the first image to the second image, wherein the animation comprises both the first image and the second image; and send instructions to a client system of a user to display the animation on a display screen of the client system.

9. The media of claim 8, wherein the subject is a user of an online social network, and wherein the software is further operable when executed to send a message to the user that a first-degree connection of the user has received an animation associated with the first geographic location.

10. The media of claim 8, wherein the modified version of the subject has been transformed based on the difference in perspective.

11. The media of claim 10, wherein the transformation comprises a scaling of the subject and a tilting of the subject.

12. The media of claim 8, wherein the first image was sent by a first user in response to a prompt sent to the first user to send an image, wherein the prompt was sent based on a user-engagement metric associated with the first geographic location.

13. The media of claim 8, wherein the object that is common to the at least two images comprises a planar front surface that comprises a polygon.

14. The media of claim 8, wherein the second image is a composite image created from a plurality of images posted to an online social network, wherein each image of the plurality of images comprises a perspective of the first geographic location.

15. A system comprising:
one or more processors; and
one or more computer-readable non-transitory storage media coupled to one or more of the processors and comprising instructions operable when executed by one or more of the processors to cause the system to:
receive at least two images captured by one or more cameras, wherein:
a first image of the at least two images comprises a first perspective of a subject from a first geographic location; and
a second image of the at least two images comprises a second perspective of the subject from a second geographic location that is different than the first geographic location;
identify, from the at least two images, an object that is common to the at least two images;
compute a difference in perspective between the at least two images that is based at least in part on a difference in size and shape between the object in the first image and the object in the second image;
generate, based on the difference in perspective, a modified version of the subject;
add, to the second image, the modified version of the subject;
generate, an animation to illustrate a transition from the first image to the second image, wherein the animation comprises both the first image and the second image; and
send instructions to a client system of a user to display the animation on a display screen of the client system.

16. The system of claim 15, wherein the subject is a user of an online social network, and wherein the processors are further operable when executing the instructions to send a message to the user that a first-degree connection of the user has received an animation associated with the first geographic location.

17. The system of claim 15, wherein the modified version of the subject has been transformed based on the difference in perspective.

18. The system of claim 17, wherein the transformation comprises a scaling of the subject and a tilting of the subject.

19. The system of claim 15, wherein the first image was sent by a first user in response to a prompt sent to the first user to send an image, wherein the prompt was sent based on a user-engagement metric associated with the first geographic location.

20. The system of claim 15, wherein the object that is common to the at least two images comprises a planar front surface that comprises a polygon.

* * * * *